(12) United States Patent
Buen (10) Patent No.: US 12,438,613 B2
(45) Date of Patent: Oct. 7, 2025

(54) QUALITY OF SERVICE (QOS) METHOD AND SYSTEM FOR FREE SPACE OPTICS (FSO) COMMUNICATIONS

(71) Applicant: The Government of the United States, as represented by the Secretary of the Navy, Washington, DC (US)

(72) Inventor: Josh Benjamin Buen, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 290 days.

(21) Appl. No.: 17/992,867

(22) Filed: Nov. 22, 2022

(65) Prior Publication Data

US 2023/0163848 A1 May 25, 2023

Related U.S. Application Data

(60) Provisional application No. 63/282,101, filed on Nov. 22, 2021.

(51) Int. Cl.
*H04B 10/112* (2013.01)
*H04Q 11/00* (2006.01)

(52) U.S. Cl.
CPC ....... *H04B 10/112* (2013.01); *H04Q 11/0062* (2013.01); *H04Q 2011/0084* (2013.01)

(58) Field of Classification Search
CPC ...... H04B 10/112; H04B 10/07; H04B 10/11; H04B 10/1123; H04B 10/079; H04B 10/0795; H04B 10/07951; H04B 10/07953; H04B 10/07955; H04B 10/07957; H04B 10/0799; H04B 10/118; H04Q 11/0062; H04Q 2011/0084; H04Q 2011/0086; H04Q 11/04
See application file for complete search history.

(56) References Cited

U.S. PATENT DOCUMENTS

| | | | |
|---|---|---|---|
| 2015/0171968 A1* | 6/2015 | Featherston | H04B 10/1123 398/118 |
| 2022/0038934 A1* | 2/2022 | Kumar | H04W 24/10 |

* cited by examiner

*Primary Examiner* — Hibret A Woldekidan
(74) *Attorney, Agent, or Firm* — US Naval Research Laboratory (57) ABSTRACT

Methods, systems, and devices to realize Quality of Service (QoS) in a Free Space Optics (FSO) communications link. In operation, the application generating the data source assigns a QoS value to each data packet for optical transmission. The FSO system converts this value to a QoS metric based on the capability of the system to synthesize transmit signals of varying bandwidths. The QoS modulator synthesizes a waveform with bandwidth selected by the QoS metric. This implementation may take the form of time-division multiplexing either at the intra- or inter-packet level; there are fixed time intervals arranged between the transmit and receive FSO systems for specific waveform bandwidths. The transmit and receive process continues in a typical fashion until the signal reaches the QoS optical receiver followed by the QoS demodulator. Here the bandwidth set by the QoS metric is accounted for in either the analog or digital domain and the recovery of the original data source follows. This process provides the advantage of improved resiliency of critical networking packets in an FSO communications link.

17 Claims, 4 Drawing Sheets

QUALITY OF SERVICE (QOS) METHOD AND SYSTEM FOR FREE SPACE OPTICS (FSO) COMMUNICATIONS

CROSS REFERENCE TO RELATED PATENT(S) AND APPLICATION(S)

This application claims the benefit of U.S. Provisional Application No. 63/282,101, filed Nov. 22, 2021, and entitled Quality of Service Implementation for Free Space Optics Communications, which is hereby incorporated in its entirety by reference.

BACKGROUND

This disclosure, and the exemplary embodiments described herein, describe methods and systems for realizing Quality of Service (QoS) in a Free Space Optics (FSO) communications link. Specifically, described are methods and systems including a QoS modulator that synthesizes a waveform with a bandwidth selected by the QoS metric, thereby controlling the Link Margin associated with a data stream associated with the QoS. The implementation described herein is related to a FSO communications link, however it is to be understood that the scope of this disclosure is not limited to such application.

Free Space Optics (FSO) are an important communications technology that is rapidly proliferating across terrestrial, maritime, airborne and space domains; there is huge DoD and commercial demand for the technology.

Superior to radio communication systems with respect to size, weight, power and cost Terrestrial FSO systems modulate laser beams to transfer information between remote terminals through a turbulent atmosphere. This distorts the laser beam and transmitted signal.

FSO Systems implement sophisticated Pointing, Acquisition and Tracking (PAT) algorithms to combat atmospheric turbulence. Atmospheric turbulence influences data transport between terminals. Unsuccessful data transmission requires retransmission. Retransmission introduces delays. Delays cause some software applications to fail.

This disclosure and the exemplary embodiments described herein, includes a device, system, and process to implement Quality of Service (QoS) into a Free Space Optics (FSO) architecture.

INCORPORATION BY REFERENCE

The following publications are incorporated by reference in their entirety.

U.S. 2022/0021464A1, published Jan. 20, 2022, patent application Ser. No. 17/376,083 filed Jul. 14, 2021, and entitled Ultra High Speed Communications System With Finite Rate Of Innovation.

U.S. Pat. No. 8,379,286 B2, granted Feb. 19, 2013, patent application Ser. No. 13/116,430 filed May 26, 2011, and entitled Integrated Angle Of Arrival Sensing And Duplex Communication With Cats-Eye Multiple Quantum Well Modulating Retroreflector.

"Indirect Line-of-Sight Free Space Optics", DTIC Accession Number AD1116423, Published Nov. 24, 2020.

BRIEF DESCRIPTION

In accordance with one embodiment of the present disclosure, disclosed is a method of operating a Free Space Optics (FSO) system that employs Quality of Service (QoS) transmission to improve a quality and reliability of transmission between FSO terminals, the method comprising: a QoS Metric generator applying a QoS metric to a data steam; a QoS modulator generating a modulated representation of the data stream, a bandwidth of the modulated representation determined by the QoS metric; an Optical Transmitter optically transmitting the modulated representation; an Optical Receiver optically receiving the transmitted modulated representation; a QoS Optical Receiver developing an intermediate frequency (IF) or baseband digital signal from the received optical signal accounting for variations in bandwidth due to the QoS metric; and a QoS demodulator recovering the data stream from the signal accounting for variations in bandwidth due to QoS metric.

In accordance with another embodiment of the present disclosure, disclosed is a Free Space Optics (FSO) system that employs Quality of Service (QoS) transmission to improve a quality and reliability of transmission between FSO terminals, the system comprising: a QoS Metric generator applying a QoS metric to a data steam; a QoS modulator generating a modulated representation of the data stream, a bandwidth of the modulated representation determined by the QoS metric; an Optical Transmitter optically transmitting the modulated representation; an Optical Receiver optically receiving the transmitted modulated representation; a QoS Optical Receiver developing an intermediate frequency (IF) or baseband digital signal from the received optical signal accounting for variations in bandwidth due to the QoS metric; and a QoS demodulator recovering the data stream from the signal accounting for variations in bandwidth due to QoS metric.

In accordance with another embodiment of the present disclosure, disclosed is a Free Space Optics (FSO) terminal that employs Quality of Service (QoS) transmission to improve a quality and reliability of transmission between FSO terminals, the system comprising: a QoS Metric generator applying a QoS metric to a data steam; a QoS modulator generating a modulated representation of the data stream, a bandwidth of the modulated representation determined by the QoS metric; and an Optical Transmitter optically transmitting the modulated representation, wherein an Optical Receiver optically receives the transmitted modulated representation, and a QoS demodulator operatively associated with the Optical Transmitter recovers the data stream from the signal accounting for variations in bandwidth due to the QoS metric.

BRIEF DESCRIPTION OF THE DRAWINGS

For a more complete understanding of the present disclosure, reference is now made to the following descriptions taken in conjunction with the accompanying drawings.

DETAILED DESCRIPTION

This disclosure and exemplary embodiments described herein provide methods and systems to realize Quality of Service (QoS) in a Free Space Optics (FSO) communications link. This process provides the advantage of improved resiliency of critical networking packets in a FSO communications link.

The disclosed novel process realizes Quality of Service (QoS) in a Free Space Optics (FSO) communications link. Free Space Optics (FSO) enables networking between nodes without direct physical connection through transmission of light signals propagating in free space. Despite its benign connotation, the free space medium (air, space, etc.) imparts a number of distortions, including static and dynamic attenuation to the optical signal. As a consequence, FSO systems must possess adequate link budget margin to operate during periods of increased attenuation to prevent partial or even complete degradation of the network. Concomitantly, some software applications have QoS requirements for proper operation. Other applications contain heartbeat or ping messages which require exchange and receipt at regular intervals. FSO systems with QoS capabilities would enable these applications to function with improved performance on FSO communication links. This disclosure, and the exemplary embodiments described herein, provide a process for improving the resiliency of critical networking packets, marked by a Quality of Service (QoS) metric, over an FSO communication link.

There currently exists software applications that do not work on an FSO communication link due to retransmission times. The exemplary embodiments described herein provides a method, system, and device for ensuring time-sensitive data has minimal retransmission.

Defined in the mid-90s, QoS is often applied to providing differing priorities to different data flows in order to guarantee the end-user a certain level of performance. Quality of Service (QoS) is the description or measurement of the overall performance of a service, such as a telephony or computer network or a cloud computing service, particularly the performance seen by the users of the network.

For an FSO system, the link margin $M_{link}$ is given by [1], $M_{link}[dB]=P_{RX,dBm}+S_r-A$, where $P_{RX,dBm}$ is the signal power received, $S_r$ is the receiver sensitivity and A are losses associated with the medium.

For optical receivers limited by shot noise, the sensitivity $S_r$ is inversely proportional to the bandwidth BW [2], $$S_r \propto \frac{1}{BW}$$

For a given system, link geometry and propagation medium, higher bandwidths require greater link margins to achieve the same performance. Conversely, lower bandwidths effectively increase the link margin, given equivalent link parameters. The QoS implementation presented here utilizes lower bandwidths for network packets with high QoS values which yields a greater link margin and increased resiliency against variations in the free space medium.

In other words, reducing bandwidth increases sensitivity and improves the Link Margin. The Innovation here is reducing the bandwidth of only priority data to ensure that data stream is uninterrupted, thereby improving the Link Margin for priority data and consequently reducing the retransmission of priority data.

Figure 1:
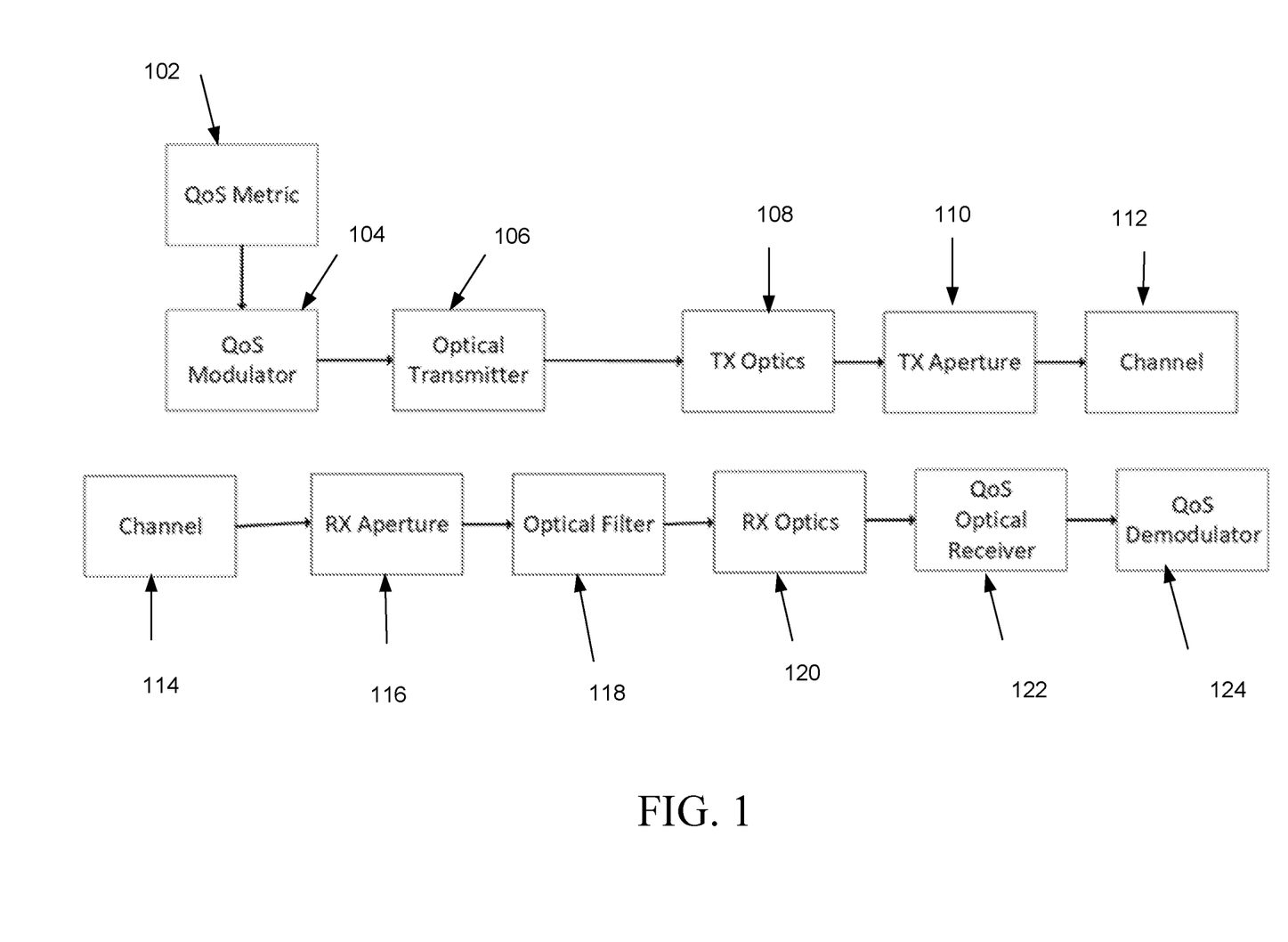
FIG. 1 shows a block diagram of an exemplary FSO Communications Link with elements specific to an QoS implementation as described herein. The table below defines the components shown in the block diagram.

FIG. 1 shows a block diagram of an exemplary FSO communication link with elements specific to an QoS implementation as described herein. The table below defines the components shown in the block diagram.

TABLE 1

QoS FSO Component Descriptions

| Component | Description |
| --- | --- |
| QoS Metric (102) | Numerical value representing QoS of an individual packet converted to a digital word |
| QoS Modulator (104) | Develops the modulated representation of the data source. The bandwidth of the modulated representation is set by the QoS metric |
| Optical Transmitter (106) | Amplifies optical source (commonly an EDFA (Erbium-Doped Fiber Amplifier) |
| TX Optics (108) | Steers optical beam (commonly a FSM (Fast Steering Mirror)) |
| TX Aperture (110) | Couples' transmitter to channel (lenses for OTA (Over-the-Air) applications) |
| Channel (112/114) | Media between TX and RX subsystems (atmosphere for OTA applications) |
| RX Aperture (116) | Couples channel to receiver (lenses for OTA applications) |
| Optical Filter (118) | Spectral limiting filter |
| RX Optics (120) | Steers optical beam (commonly a FSM) |
| QoS Optical Receiver (122) | Develops Intermediate Frequency (IF), or baseband digital signal from optical signal accounting for variations in bandwidth due to QoS metric |
| QoS Demodulator (124) | Recovers data source from the signal accounting for variations in bandwidth due to QoS metric |

In operation, the application generating the data source assigns a QoS value to each data packet. The QoS value may reside internally to the packet structure, e.g., an additional digital word, or externally, e.g., socket or port number. The FSO system converts this value to a QoS metric 102 based on the capability of the system to synthesize transmit signals of varying bandwidths. The QoS modulator 104 synthesizes a waveform with bandwidth selected by the QoS metric. This implementation may take the form of time-division multiplexing either at the intra- or inter-packet level; there are fixed time intervals arranged between the transmit and receive FSO systems for specific waveform bandwidths. The transmit process (106; 108; 110; 112) and receive process (114; 116; 118; 120) continues in a typical fashion until the signal reaches the QoS optical receiver followed by the QoS demodulator. Here the bandwidth set by the QoS metric is accounted for in either the analog or digital domain using standard engineering practices. Recovery of the original data source follows standard implementations.

Provided below are further details of each sub-process/module.

QoS Metric (102)

The QoS Metric quantifies the Quality of Service level for each grouping of network data. An example implementation used an unsigned char in the C programming language. Of this, the three Least Significant Bits (LSB) represented the QoS Metric. A value of 7, or all three bits having a value of '1', corresponded to a the highest QoS Metric, or most critical and sensitive data. A value of 0, or all three bits having a value of '0', corresponded to the lowest QoS Metric, or the least critical and sensitive data.

The example implementation defined a single QoS Metric for each packet of data; the example implementation defined a single packet as 1024 bits of data. Furthermore, the example implementation defines a block of data as 1024 packets. Each block of data had 1024 QoS Metrics associated with it, a single QoS Metric for each packet.

QoS Modulator (104)

The example implementation for the QoS Modulator consisted of three main components. The first was a COTS 1550 nm fiber-coupled laser which functioned to generate the effective carrier wave to later modulate with the data signal. The second was a COTS Acoustic Optical Modulator (AOM) which functioned to provide Amplitude Modulation (AM) on the optical signal generated by the fiber-coupled laser by attenuating the optical signal proportional to the applied voltage. The third was a COTS Digital-to-Analog Converter (DAC) connected to a Personal Computer (PC) which functioned to provide the voltage input signal for the AOM.

The example implementation represented a data bit of '1' with no applied attenuation and a data bit of '0' with maximum applied attenuation. As mentioned above, each data packet and hence each data bit has an associated QoS Metric. QoS Modulation is implemented by increasing the duration, or number of data clock cycles, of each bit proportional to the QoS Metric. For example, when the QoS Metric is '7', then each bit duration is eight data clock cycles. When the QoS Metric is '0', each bit duration is one data clock cycles. For each data clock cycle that the data bit is high, the PC commands the DAC to generate a low voltage and vice versa for when the data bit is low. The AOM produces the corresponding AM onto the optical signal. By this process, the example implementation changes the bandwidth of the signal based on the QoS Metric.

Optical Transmitter (106)

The example implementation uses a COTS Erbium-Doped Fiber Amplifier (EDFA) as an optical amplifier to increase the power of the optical signal from the QoS Modulator. The optical signal output of the QoS Modulator does not contain sufficient optical power for transmission through Free Space. The optical signal amplified by the optical transmitter is suitable for Free Space transmission.

TX Optics (108)

The example implementation for the TX Optics employs standard optical components, a fiber launch, fold mirrors and COTS Fast-Steering Mirror (FSM) to guide and route the optical signal from the Optical Transmitter to the TX aperture. The fiber launch functions to couple the output of the Optical Transmitter into Free Space. The fold mirrors allow the entire optical apparatus to remain compact, a standard optical engineering practice. A FSM functions to provide precise angular positioning of the optical beam.

TX Aperture (110)

The example implementation for the TX Aperture employs a lens which functions to disperse the optical beam into the optical channel, a standard optical engineering practice.

Channel (112/114)

The optical Channel is the medium, air, through which the optical beam is transmitted and received.

RX Aperture (116)

The example implementation for the TX Aperture employs a lens which functions to focus the optical beam from the optical channel onto the RX Optics, a standard optical engineering practice.

Optical Filter (118)

The example implementation for the TX Aperture employs a COTS optical filter to attenuate the amount of light from the optical potion of the spectrum that enters the RX Optics from the RX Aperture.

RX Optics (120)

The example implementation for the TX Optics employs standard optical components, COTS Fast-Steering Mirror (FSM), fold mirrors and a fiber coupler. The FSM functions to provide precise angular positioning of the optical beam onto the optical receive chain. The fold mirrors allow the entire optical apparatus to remain compact, a standard optical engineering practice. The fiber coupler guides the free space optical beam into a fiber optic cable.

QoS Optical Receiver (122)

The example implementation for the QoS Optical Receiver employs an Avalanche Photodiode paired with a Trans-Impedance Amplifier (APD-TIA) which functions as a transceiver to receive the optical signal and transform it into an electrical voltage. The APD-TIA produces an electrical voltage proportional the power of the incident light onto the device.

QoS Demodulator (122)

According to the example implementation, the QoS Demodulator consists of a COTS Analog-to-Digital Converter (ADC) connected to a PC. For each data clock cycle, the ADC provides the PC with a 16-bit word representing the magnitude of the sampled voltage. The QoS Metric associated with each data packet determines the number of data clock cycles that comprise an individual bit. Each bit is digitally filtered according to the number of data clock cycles defined by the QoS Metric to improve Signal-to-Noise Ratio (SNR). The PC software aggregates the individual bits into data packets, completing the communications sequence.

In addition, according to the example implementation, the QoS Optical Receiver includes an analog circuit which functions to filter the output of the APD-TIA with the bandwidth of the filter set by an external voltage signal input. The bandwidth of the circuit is proportional to the level of the external voltage signal with higher voltages resulting in larger bandwidths. The DAC used earlier for the QoS Modulator provided this voltage signal with an appropriate time delay to account for the signal propagation.

Figure 2:
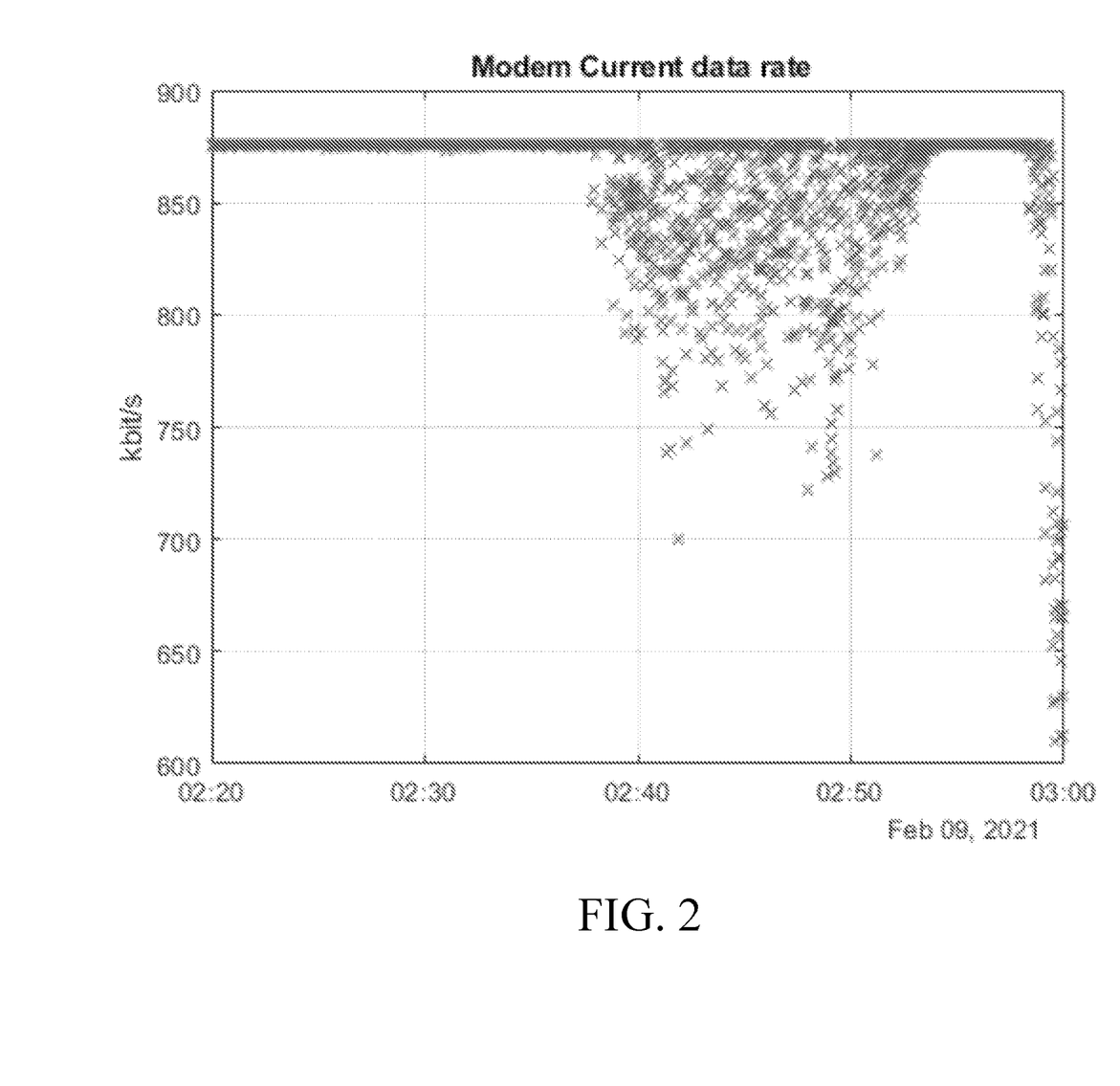
FIG. 2 shows a graph of Modem Current Data Rate.

With reference to FIG. 2, shown is a graph of Modem Current Data Rate.

Figure 3:
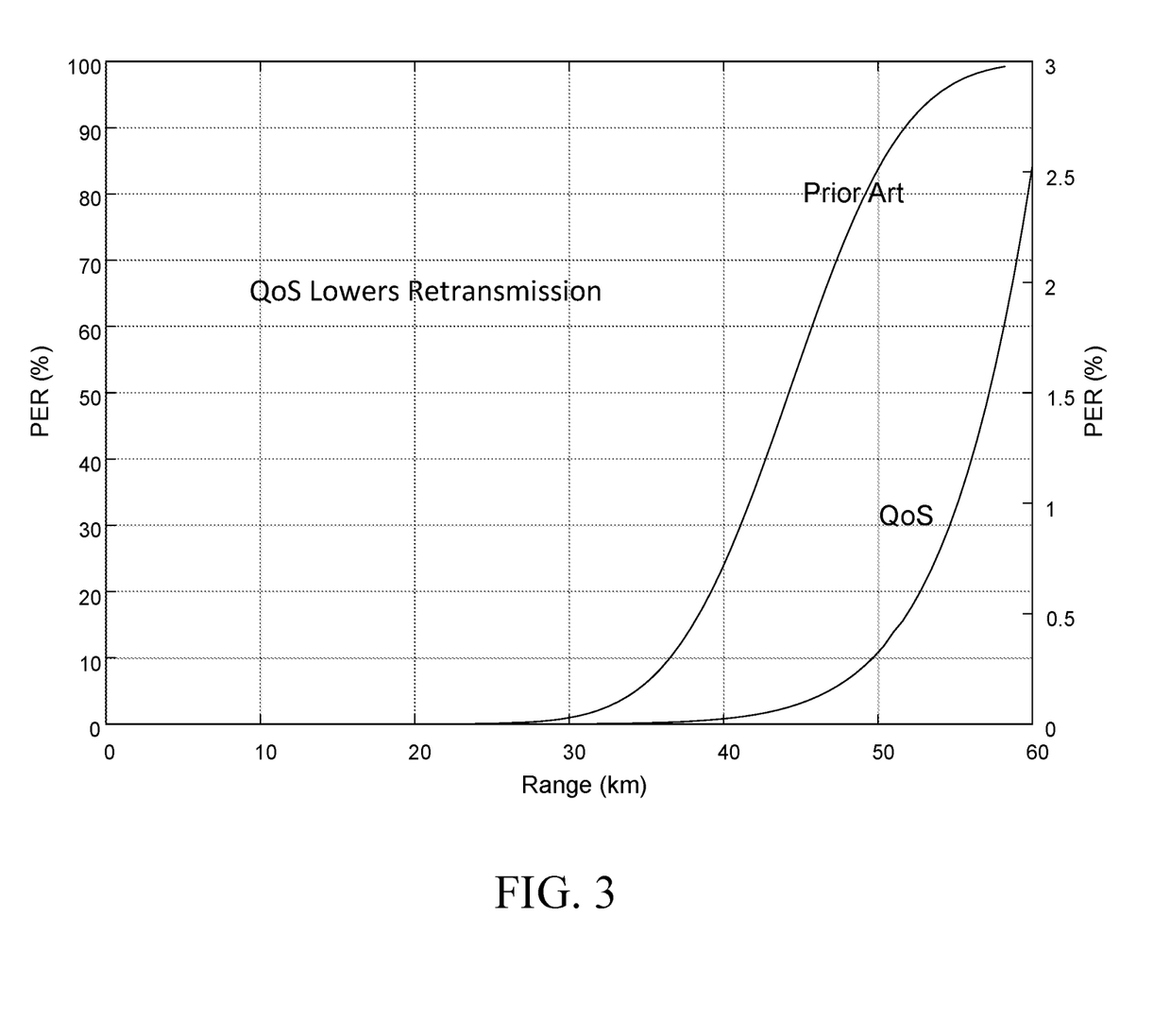
FIG. 3 shows a graph of Signal Error Rate with and without QoS implemented according to an exemplary embodiment of this disclosure.

With reference to FIG. 3, shows a graph of Signal Error Rate with and without QoS implemented according to an exemplary embodiment of this disclosure. (Optical Simulation) The Simulation tool calculates signal strength and figures of merit for optical communications systems; the simulations demonstrate feasible FSO communication links using a model of the disclosed Free Space Optics (FSO)

system that employs Quality of Service (QoS) transmission to improve a quality and reliability of transmission between FSO terminals. As shown, the simulation predicts successful or failed transmission for a given system based on environmental conditions and compares signal error rate with and without QoS implemented, where QoS Implementation Lowers Retransmission.

Figure 4:
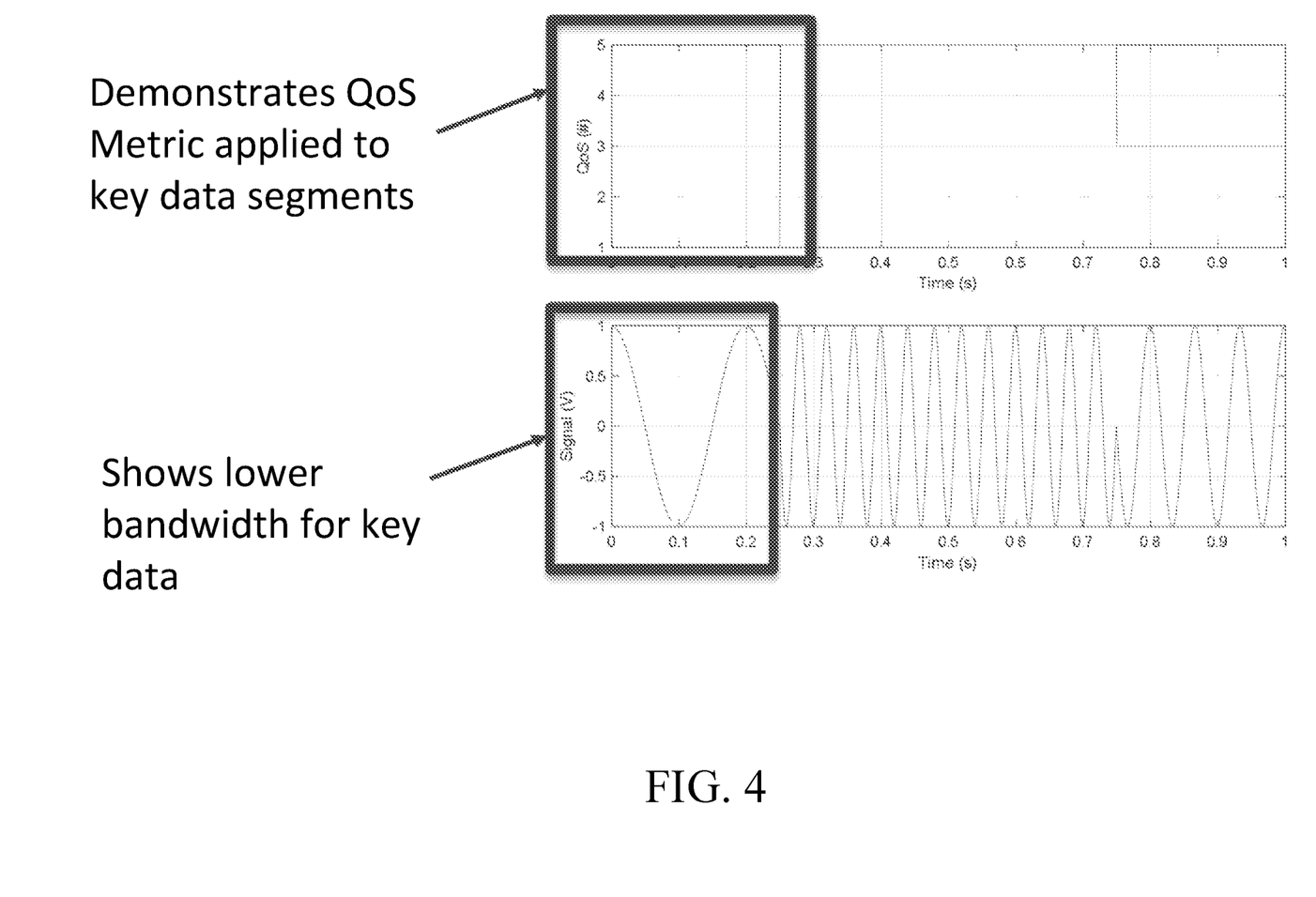
FIG. 4 shows a QoS Metric applied to key data segments (Top) and, accordingly, a lower bandwidth for the key data (Lower).

With reference to FIG. 4, shown is a QoS Metric applied to key data segments (Top) and, accordingly, a lower bandwidth for the key data (Lower). (MATLAB Simulation). The MATLAB simulation of the QoS Metric demonstrates a QoS Metric applied to key data segments which lowers bandwidth for key data and demonstrates feasibility of QoS in FSO communication links for bandwidth modulation.

To summarize, key advantages and novel features of this disclosure, and the exemplary embodiments described herein, include, but are not limited to, (Advantages) the enablement of software applications requiring low latency, previously unusable via FSO; improved efficiency of FSO data transport; reduction of data retransmission; (Novel Features) FSO equipped with hardware & software elements required for QoS; QoS metric added to each element of data; and QoS metric adjusts bandwidth, increasing the link margin and providing increased resiliency against variations in the free space medium.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method of operating a Free Space Optics (FSO) system that employs Quality of Service (QoS) transmission between FSO terminals, the method comprising:
   a QoS Metric generator applying a QoS metric to a data steam;
   a QoS modulator generating a modulated representation of the data stream, a bandwidth of the modulated representation determined by the QoS metric;
   an Optical Transmitter optically transmitting the modulated representation;
   an Optical Receiver optically receiving the transmitted modulated representation;
   a QoS Optical Receiver developing an intermediate frequency (IF) or baseband digital signal from the received modulated representation accounting for variations in bandwidth due to the QoS metric; and
   a QoS demodulator recovering the data stream from the signal accounting for variations in bandwidth due to the QoS metric,
   wherein the QoS modulator synthesizes a waveform with the bandwidth selected by the QoS metric using time-division multiplexing either at an intra- or inter-data packet level.

2. The method of operating a Free Space Optics (FSO) system according to claim 1, wherein the QoS Metric generator generates a QoS metric value associated with the data stream, the QoS metric value having a higher value for higher priority data streams.

3. The method of operating a Free Space Optics (FSO) system according to claim 2, wherein the QoS metric value is included in the data stream.

4. The method of operating a Free Space Optics (FSO) system according to claim 1, wherein the QoS modulator bandwidth is lower for data streams associated with a higher QoS metric value.

5. The method of operating a Free Space Optics (FSO) system according to claim 1,
   wherein the QoS Metric generator generates a QoS metric value associated with the data stream,
   wherein the QoS metric value has a higher value for higher priority data streams,
   wherein the QoS metric value is included in the data stream, and
   wherein the QoS modulator bandwidth is lower for data streams associated with a higher QoS metric value.

6. The method of operating a Free Space Optics (FSO) system according to claim 1, wherein there are fixed time intervals between transmitting the modulated representation for specific waveform bandwidths.

7. A Free Space Optics (FSO) system that employs Quality of Service (QoS) transmission between FSO terminals, the system comprising:
   a QoS Metric generator applying a QoS metric to a data steam;
   a QoS modulator generating a modulated representation of the data stream, a bandwidth of the modulated representation determined by the QoS metric;
   an Optical Transmitter optically transmitting the modulated representation;
   an Optical Receiver optically receiving the transmitted modulated representation;
   a QoS Optical Receiver developing an intermediate frequency (IF) or baseband digital signal from the received modulated representation accounting for variations in bandwidth due to the QoS metric; and
   a QoS demodulator recovering the data stream from the signal accounting for variations in bandwidth due to the QoS metric,
   wherein the QoS modulator synthesizes a waveform with the bandwidth selected by the QoS metric using time-division multiplexing either at an intra- or inter-data packet level.

8. The Free Space Optics (FSO) system according to claim 7, wherein the QoS Metric generator generates a QoS metric value associated with the data stream, the QoS metric value having a higher value for higher priority data streams.

9. The Free Space Optics (FSO) system according to claim 8, wherein the QoS metric value is included in the data stream.

10. The Free Space Optics (FSO) system according to claim 7, wherein the QoS modulator bandwidth is lower for data streams associated with a higher QoS metric value.

11. The Free Space Optics (FSO) system according to claim 7,
wherein the QoS Metric generator generates a QoS metric value associated with the data stream,
wherein the QoS metric value has a higher value for higher priority data streams,
wherein the QoS metric value is included in the data stream, and
wherein the QoS modulator bandwidth is lower for data streams associated with a higher QoS metric value.

12. The Free Space Optics (FSO) system according to claim 7, wherein there are fixed time intervals between transmitting the modulated representation for specific waveform bandwidths.

13. A Free Space Optics (FSO) terminal that employs Quality of Service (QoS) transmission between FSO terminals, the system comprising:
a QoS Metric generator applying a QoS metric to a data steam;
a QoS modulator generating a modulated representation of the data stream, a bandwidth of the modulated representation determined by the QoS metric; and
an Optical Transmitter optically transmitting the modulated representation,
wherein an Optical Receiver optically receives the transmitted modulated representation, and a QoS demodulator operatively associated with the Optical Transmitter recovers the data stream from the signal accounting for variations in bandwidth due to the QoS metric,
wherein the QoS modulator synthesizes a waveform with the bandwidth selected by the QoS metric using time-division multiplexing either at an intra- or inter-data packet level.

14. The Free Space Optics (FSO) system according to claim 13, wherein the QoS Metric generator generates a QoS metric value associated with the data stream, the QoS metric value having a higher value for higher priority data streams.

15. The Free Space Optics (FSO) system according to claim 13, wherein the QoS metric value is included in the data stream.

16. The Free Space Optics (FSO) system according to claim 13, wherein the QoS modulator bandwidth is lower for data streams associated with a higher QoS metric value.

17. The Free Space Optics (FSO) system according to claim 13,
wherein the QoS Metric generator generates a QoS metric value associated with the data stream,
wherein the QoS metric value has a higher value for higher priority data streams,
wherein the QoS metric value is included in the data stream, and
wherein the QoS modulator bandwidth is lower for data streams associated with a higher QoS metric value.

* * * * *

UNITED STATES PATENT AND TRADEMARK OFFICE
CERTIFICATE OF CORRECTION

Page 1 of 1

| | |
|---|---|
| PATENT NO. | : 12,438,613 B2 |
| APPLICATION NO. | : 17/992867 |
| DATED | : October 7, 2025 |
| INVENTOR(S) | : Joshua Benjamin Beun |

It is certified that error appears in the above-identified patent and that said Letters Patent is hereby corrected as shown below:

On the Title Page

Item (12) "Buen" should read -- Beun --.

Item (72) The name of the inventor, "Josh Benjamin Buen", should be "Joshua Benjamin Beun".

Signed and Sealed this
Ninth Day of December, 2025

John A. Squires
*Director of the United States Patent and Trademark Office*